United States Patent
Haidet et al.

(10) Patent No.: US 11,904,561 B2
(45) Date of Patent: Feb. 20, 2024

(54) TIRE WITH SHAPED TREAD

(71) Applicant: Bridgestone Americas Tire Operations, LLC, Nashville, TN (US)

(72) Inventors: Andrew V. Haidet, Silver Lake, OH (US); Douglas B. Costlow, Akron, OH (US); Robert W. Asper, Wadsworth, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 112 days.

(21) Appl. No.: 17/478,167

(22) Filed: Sep. 17, 2021

(65) Prior Publication Data
US 2022/0016857 A1 Jan. 20, 2022

Related U.S. Application Data

(62) Division of application No. 16/061,219, filed as application No. PCT/US2016/067669 on Dec. 20, 2016, now Pat. No. 11,155,050.

(Continued)

(51) Int. Cl.
    *B29D 30/02* (2006.01)
    *B60C 7/08* (2006.01)
    (Continued)

(52) U.S. Cl.
    CPC .............. *B29D 30/02* (2013.01); *B29D 30/58* (2013.01); *B33Y 80/00* (2014.12); *B60C 7/08* (2013.01);
    (Continued)

(58) Field of Classification Search
    CPC .................................. B60C 7/102; B60C 7/08
    See application file for complete search history.

(56) References Cited

U.S. PATENT DOCUMENTS

| 1,126,648 A | 1/1915 | Marble |
| 1,447,784 A | 3/1923 | Hulse |

(Continued)

FOREIGN PATENT DOCUMENTS

| CN | 106163832 | 11/2016 |
| DE | 102012211450 | 1/2014 |

(Continued)

OTHER PUBLICATIONS

MakerGeeks; 3D Printg a Rubber Tire with Flex EcoPLA at MakerGeeks.com. Jun. 22, 2013 .<https://web.archive.org/web/20140307033550/https://www.youtube.com/watch?v=E5x8BMdATBc>. Accessed via WayBack Machine Sep. 12, 2023. (Year: 2013).*

(Continued)

*Primary Examiner* — Robert C Dye
*Assistant Examiner* — Alexander D Booth
(74) *Attorney, Agent, or Firm* — Shaun J. Fox; Bryan J. Jaketic

(57) ABSTRACT

A green tire includes a plurality of sheets of green rubber having a substantially circular shape, with each sheet having a tread region disposed along a circumference. A plurality of objects are sandwiched between adjacent sheets of green rubber in the tread region. Each object is constructed of a material selected from the group consisting of steel, polyester, nylon, carbon fiber, aramid, fiber glass, cotton, hemp, polyurethane and other plastic, other synthetic or natural fibers and other metal materials.

16 Claims, 4 Drawing Sheets

Related U.S. Application Data

(60) Provisional application No. 62/272,163, filed on Dec. 29, 2015.

(51) Int. Cl.

| | | |
|---|---|---|
| *B60C 11/03* | (2006.01) | |
| *B60C 11/14* | (2006.01) | |
| *B60C 7/22* | (2006.01) | |
| *B60C 7/10* | (2006.01) | |
| *B29D 30/00* | (2006.01) | |
| *B60C 9/22* | (2006.01) | |
| *B60C 7/14* | (2006.01) | |
| *B29D 30/58* | (2006.01) | |
| *B33Y 80/00* | (2015.01) | |
| *B29D 30/52* | (2006.01) | |

(52) U.S. Cl.
CPC ............... *B60C 7/10* (2013.01); *B60C 7/143* (2013.01); *B60C 7/22* (2013.01); *B60C 9/2204* (2013.01); *B60C 11/0323* (2013.01); *B60C 11/14* (2013.01); *B29D 2030/0083* (2013.01); *B29D 2030/526* (2013.01); *B60C 7/107* (2021.08); *B60C 7/146* (2021.08); *B60C 2011/142* (2013.01)

(56) References Cited

U.S. PATENT DOCUMENTS

| | | | |
|---|---|---|---|
| 2,264,767 A | 12/1941 | Ofensend | |
| 2,485,304 A | 10/1949 | Marsh | |
| 3,112,024 A | 11/1963 | Lakin | |
| 3,630,257 A | 12/1971 | Goldberger | |
| 4,287,927 A | 9/1981 | Caravito | |
| 4,934,429 A | 6/1990 | Koseki et al. | |
| 5,401,037 A | 3/1995 | O'Donnell | |
| 5,676,900 A | 10/1997 | Pajtas | |
| 7,032,634 B2 | 4/2006 | Laurent et al. | |
| 7,143,797 B2 | 12/2006 | Vannan | |
| 8,104,524 B2 | 1/2012 | Manesh et al. | |
| 8,176,957 B2 | 5/2012 | Manesh | |
| 8,491,981 B2 | 7/2013 | Delfino et al. | |
| 8,851,131 B2 | 10/2014 | Luchini et al. | |
| 8,883,283 B2 | 11/2014 | Delfino et al. | |
| 8,962,120 B2 | 2/2015 | Delfino et al. | |
| 2009/0107596 A1 | 4/2009 | Palinkas | |
| 2010/0200131 A1 | 8/2010 | Masanori et al. | |
| 2011/0017374 A1* | 1/2011 | Bervas | B60C 11/12 152/209.18 |
| 2011/0024008 A1* | 2/2011 | Manesh | B60C 7/22 152/5 |
| 2011/0214789 A1 | 9/2011 | Cress et al. | |
| 2012/0060991 A1 | 3/2012 | Mun et al. | |
| 2013/0248067 A1 | 9/2013 | Delfino et al. | |
| 2013/0319591 A1* | 12/2013 | Van De Wiele | B60C 7/102 152/246 |
| 2014/0000777 A1 | 1/2014 | Choi et al. | |
| 2014/0238561 A1 | 8/2014 | Choi et al. | |
| 2014/0353862 A1 | 12/2014 | Erdman | |
| 2015/0034225 A1 | 2/2015 | Martin | |
| 2015/0053324 A1 | 2/2015 | Lee et al. | |
| 2015/0122382 A1 | 5/2015 | Choi et al. | |
| 2015/0174954 A1 | 6/2015 | Asper | |
| 2015/0251498 A1 | 9/2015 | Thompson | |
| 2016/0016433 A1* | 1/2016 | Amstutz | B60C 7/10 152/72 |
| 2017/0113489 A1 | 4/2017 | Iwamura | |

FOREIGN PATENT DOCUMENTS

| | | | |
|---|---|---|---|
| EP | 1381527 | | 1/2004 |
| EP | 1754615 | | 6/2006 |
| GB | 169320 | * | 9/1921 |
| JP | H05147044 | | 6/1993 |
| JP | 2001191721 | | 7/2001 |
| KR | 20150129140 | | 11/2015 |
| KR | 1020150129140 | | 11/2015 |
| WO | 9425297 | | 11/1994 |
| WO | 02083435 | | 10/2002 |
| WO | 2011011419 | | 1/2011 |
| WO | 2014183890 | | 11/2014 |

OTHER PUBLICATIONS

Search Report and Written Opinion; Corresponding PCT application Serial No. PCT/US2016/067669; dated Mar. 15, 2017; Authorized Officer Lee, Eun Kyu.

Machine Translation of cited Foreign Reference JP2001191721A.

European Search Report; corresponding EP Application Serial No. 21164502; dated May 1, 2021.

Tolentino, Melissa; Bridgestone's non-pneumatic tires; URL: https://web.archive.org/web/20151024040239/https://siliconangle.com/blog/2013/11/20/3d-printed-car-to-traverse-us-roads-in-2-years/; Nov. 20, 2013.

International Search Report and Written Opinion; corresponding PCT Application Serial No. PCT/US2016/067669; Authorized Office Lee, Eun Kyu; dated Mar. 15, 2017.

MakerGeeks; 3D Printing a Rubber Tire with Flex EcoPLA at MakerGeeks.com; URL: https://web.archive.org/web/20130929001145/https://www.youtube.com/watch?v=E5x8BMdATBc; Jun. 22, 2013.

* cited by examiner

TIRE WITH SHAPED TREAD

CROSS-REFERENCE TO RELATED APPLICATIONS

This application is a divisional of U.S. patent application Ser. No. 16/061,219 filed on Jun. 11, 2018, which in turn is a national stage entry of PCT/US16/67669, filed on Dec. 20, 2016, which in turn claims the benefit of priority of U.S. Provisional Application No. 62/272,163, filed on Dec. 29, 2015, each of which is incorporated herein by reference in its entirety.

FIELD OF INVENTION

The present disclosure is directed to a tire having a shaped tread and a method of making the same. More particularly, the present disclosure is directed to a tire having a tread having voids or embedded elements.

BACKGROUND

Known tire manufacturing methods involve building a green tire, including a green tread, and vulcanizing the green tire and tread in a mold. When a green tire is placed in a mold, the volume between the green tire and the mold features must be filled with rubber. Thus, viscous rubber flows into the volume between the green tire and the mold features. The viscous rubber and green tire are cured during vulcanization.

SUMMARY OF THE INVENTION

In one embodiment, a green tire includes a plurality of sheets of green rubber having a substantially circular shape. Each sheet has a tread region disposed along a circumference. A plurality of objects are sandwiched between adjacent sheets of green rubber in the tread region. Each object is constructed of a material selected from the group consisting of steel, polyester, nylon, carbon fiber, aramid, fiber glass, cotton, hemp, polyurethane and other plastic, other synthetic or natural fibers, and other metal materials.

In another embodiment, a green tire includes a plurality of sheets of green rubber having a substantially circular shape. Each sheet has a tread region disposed along a circumference. Each sheet of green rubber has a plurality of voids disposed below a surface of the tread region, such that the voids are not visible from an external view of the tire. A plurality of objects are sandwiched between adjacent sheets of green rubber in the tread region.

In yet another embodiment, a green tire includes a plurality of sheets of green rubber having a substantially circular shape. Each sheet has a tread region disposed along a circumference, an upper ring, a lower ring, and a plurality of spoke portions extending from the upper ring to the lower ring. A plurality of objects are sandwiched between adjacent sheets of green rubber in the tread region. At least one of the plurality of objects protrudes beyond the tread region of the green tire.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
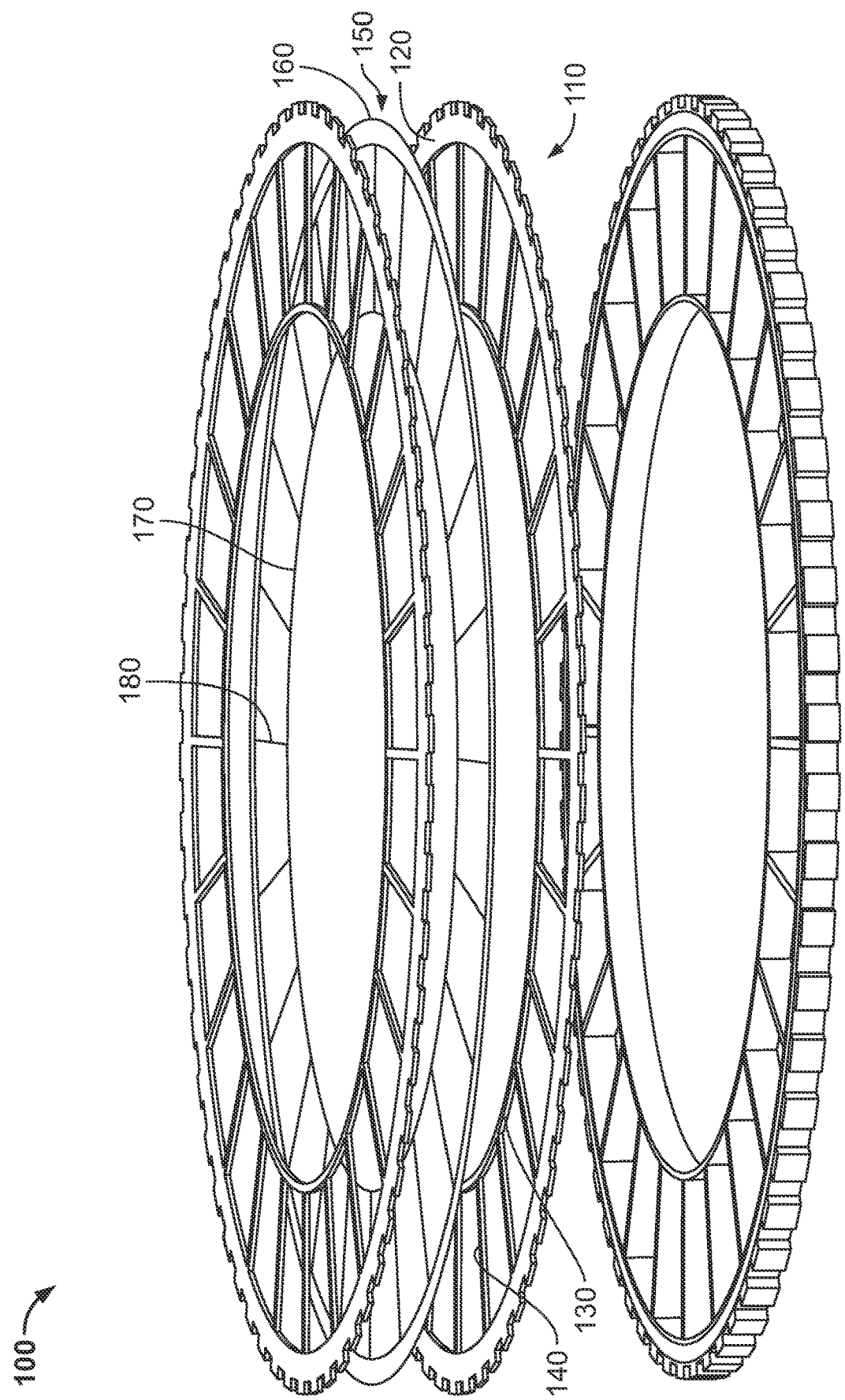
FIG. 1 illustrates an exploded view of one embodiment of a partially assembled non-pneumatic tire.

The following includes definitions of selected terms employed herein. The definitions include various examples and/or forms of components that fall within the scope of a term and that may be used for implementation. The examples are not intended to be limiting. Both singular and plural forms of terms may be within the definitions.

"3D printer" refers to a machine used for 3D printing.

"3D printing" refers to the fabrication of objects through the deposition of a material using a print head, nozzle, or another printer technology.

"Additive manufacturing" refers to a process of joining materials to make objects from 3D model data, usually layer upon layer, as opposed to subtractive manufacturing methodologies. Additive manufacturing includes 3D printing, binder jetting, directed energy deposition, fused deposition modeling, laser sintering, material jetting, material extrusion, powder bed fusion, rapid prototyping, rapid tooling, sheet lamination, and vat photopolymerization.

"Additive systems" refer to machines used for additive manufacturing.

"Axial" and "axially" refer to a direction that is parallel to the axis of rotation of a tire.

"Bead" refers to the part of the tire that contacts a wheel and defines a boundary of the sidewall.

"Circumferential" and "circumferentially" refer to a direction extending along the perimeter of the surface of the tread perpendicular to the axial direction.

"Equatorial plane" refers to the plane that is perpendicular to the tire's axis of rotation and passes through the center of the tire's tread.

"Radial" and "radially" refer to a direction perpendicular to the axis of rotation of a tire.

"Sidewall" refers to that portion of the tire between the tread and the bead.

"Spoke" refers to one or more bars, rods, webbing, mesh, or other connecting member extending from a lower member to an upper member. A spoke may include a solid sheet of material.

"Subtractive manufacturing" refers to making objects by removing of material (for example, buffing, milling, drilling, grinding, carving, cutting, etc.) from a bulk solid to leave a desired shape, as opposed to additive manufacturing.

"Tread" as used herein, refers to that portion of the tire that comes into contact with the road or ground under normal inflation and normal load.

"Tread width" refers to the width of the ground contact area of a tread which contacts with road surface during the rotation of the tire under normal inflation and load.

Directions are stated herein with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread than the "lower" or "bottom" element. Additionally, when relative directional terms such as "above" or "below" are used in connection with an element, an element that is "above" another element is closer to the tread than the other element.

The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element.

While similar terms used in the following descriptions describe common tire components, it is understood that because the terms carry slightly different connotations, one of ordinary skill in the art would not consider any one of the following terms to be purely interchangeable with another term used to describe a common tire component.

FIG. 1 illustrates an exploded view of one embodiment of a partially assembled non-pneumatic tire 100. The non-pneumatic tire 100 includes a plurality of sheets of polymeric material 110 having a substantially circular shape. In this particular embodiment, each sheet of polymeric material includes an upper ring 120, a lower ring 130, and a plurality of spoke portions 140 extending from the upper ring 120 to the lower ring 130. In an alternative embodiment (not shown), not every sheet of polymeric material includes an upper ring, a lower ring, and a plurality of spoke portions. In one such example, some sheets include an upper ring, a lower ring, and a plurality of spoke portions, while other sheets omit the spoke portion or the lower ring. In another example, some sheets omit the upper ring.

In the illustrated embodiment, the upper ring 120 of each sheet includes a tread portion. The tread portion is shaped to form a tread design. In the illustrated embodiment, the tread portion forms a tread design having a plurality of rectangular tread blocks separated by a plurality of lateral grooves. In alternative embodiments (not shown), the tread portion may form a tread design having ribs, circumferential grooves, sipes, or tread blocks of various shapes and sizes. The tread may be symmetric or asymmetric.

In the illustrated embodiment, each sheet of polymeric material includes 24 spoke portions. In alternative embodiments, each sheet of polymeric material may have any number of spoke portions. In some examples, each sheet of polymeric material has 10-40 spoke portions.

In the illustrated embodiment, each sheet of polymeric material 110 has the same number of spoke portions 140. Additionally, each spoke portion 140 in each sheet 110 has substantially the same shape and size. Further, the spoke portions 140 of adjacent sheets 110 are aligned with each other. However, it should be understood that in alternative embodiments, some sheets may have a different number of spoke portions. Additionally, in other alternative embodiments, the sizes and shapes of the spoke portions on a given sheet may vary. Likewise, in still other alternative embodiment, the spoke portions on a given sheet may have different sizes and shape with respect to the spoke portions on another sheet. Moreover, the spoke portions of different sheets may not be aligned with each other.

In one embodiment, each sheet of polymeric material is constructed of green rubber. In an alternative embodiment, each sheet of polymeric material is constructed of cured rubber. In alternative embodiments, the sheet of polymeric material may be constructed of a foamed polymer, polyurethane, thermoplastics, resins, or other elastomeric or polymeric material. In another alternative embodiment, the sheet is formed of metal instead of a polymeric material. In one embodiment, each sheet is made of a uniform material. In an alternative embodiment, each sheet is constructed of a plurality of different materials. For example, the tread portion, upper ring, lower ring, and spokes may be constructed of different materials. Additionally, different sheets may be constructed of different materials. In any of the above embodiments, adhesive may be employed between sheets of material.

In one embodiment, each sheet of polymeric material is formed by an additive manufacturing method. For example, each sheet may be made by 3D printing, binder jetting, directed energy deposition, fused deposition modeling, laser sintering, material jetting, material extrusion, powder bed fusion, rapid prototyping, rapid tooling, sheet lamination, or vat photopolymerization. A jig or other fixture may be employed to aid in the assembly of multiple sheets to ensure proper orientation of each sheet. Alternatively, a jig or fixture may help define the shape of an individual sheet during the additive manufacturing process.

In an alternative embodiment, each sheet of polymeric material is formed by a subtractive manufacturing method. For example, the sheet of polymeric material may be cut (such as with a die, knife, or laser). Where a subtractive process is used, the sheet may be shaped before it is placed on top of the other sheets. Alternatively, the sheet may be only partially formed before it is placed on top of the other sheets, and then cut to its final shape after placement. Such a process would obviate the need for exactly placement of the sheet.

In another alternative embodiment, each sheet of polymeric material is formed by a molding process.

In one embodiment, each sheet of polymeric material 110 has a thickness of about 2 mm (~0.080 inches). In alternative embodiments, each sheet of polymeric material may have a thickness between 0.02 mm to 25.4 mm (0.001 inches to 1 inch). In one embodiment, each sheet of polymeric material in the tire has substantially the same thickness. In alternative embodiments, the thickness of the sheets may vary. For example, thicker or thinner sheets may be used at different locations to change the spacing or placement of a reinforcement. It should be understood that in an additive manufacturing process, the sheets may not be visibly distinct from each other and thus they may not have a discernible thickness.

With continued reference to FIG. 1, the non-pneumatic tire 100 further includes a plurality of reinforcements 150, with each reinforcement 150 being disposed between adjacent sheets of polymeric material 110. In the illustrated embodiment, the reinforcement 150 is a plurality of cords forming a pair of upper rings 160, a lower ring 170, and a plurality of spoke reinforcements 180. The cords may also be referred to as wires or filaments. The upper rings 160 of the reinforcement 150 are sandwiched between the upper rings 120 of adjacent sheets of polymeric material 110. Likewise, the lower ring 170 of the reinforcement 150 is sandwiched between the lower rings 130 of adjacent sheets of polymeric material 110. Additionally, the spoke reinforcements 180 are sandwiched between the spoke portions 140 of adjacent sheets of polymeric material 110.

The pair of upper rings 160 of the reinforcement 150 are positioned such that when the tire 100 is cured, the upper rings 160 of the reinforcement 150 form a shear element defined by the upper pair of rings 120 of the sheets of polymeric material 110. In other words, a portion of the upper rings 120 of the polymeric material 110 is an elastic material disposed radially between the substantially inelastic membranes formed by the pair of upper rings 160 of the reinforcement 150.

However, it should be understood that the shape of the reinforcement 150 shown in FIG. 1 is merely exemplary. In alternative embodiments, some or all of the upper rings 160 of the reinforcement 150 may be omitted. Likewise, some or all of the lower rings 170 of the reinforcement 150 may be omitted. Additionally, some or all of the spoke reinforcements 180 may be omitted. In other alternative embodiments, multiple reinforcements may be employed on some portions. While the reinforcements are continuous components in the illustrated embodiment, it should be understood that the reinforcements may be discontinuous. For example, the reinforcements may be chopped fibers that are distributed along portions of a polymeric sheet.

The reinforcement 150 may be constructed of a material selected from the group consisting of steel, polyester, nylon, carbon fiber, aramid, fiber glass, cotton, hemp, polyurethane and other plastic, other synthetic or natural fibers, and other metal materials. While the reinforcement 150 is shown as a plurality of cords in FIG. 1, in alternative embodiments, the reinforcement is a mesh of material or a sheet of material. In another alternative embodiment, the reinforcement may be chopped fibers.

To construct the non-pneumatic tire 100, the method includes forming a first sheet of polymeric material 110 having a substantially circular shape. The first sheet of polymeric material 110 may be formed using any of the methods described above. The first sheet of polymeric material 110 may be formed on a flat surface, or it may be formed on a jig or fixture.

The method then includes placing a reinforcement 150 on the first sheet of polymeric material 110. In one embodiment, the reinforcement 150 has a preformed shape before it is placed on the first sheet of polymeric material 110. In an alternative embodiment, the reinforcement 150 may be shaped as it is being placed on the first sheet of polymeric material 110. For example, the reinforcement may be extruded or 3D printed onto the first sheet of polymeric material 110.

The method further includes placing a second sheet of polymeric material having a substantially circular shape on the first sheet of polymeric material, such that the reinforcement 150 is sandwiched between the first sheet of polymeric material and the second sheet of polymeric material. The method is then repeated, so that additional reinforcements and additional sheets of polymeric material are placed on top of each other until a tire is built having a predetermined width. In other words, the tire is built in a direction perpendicular to the axis of rotation of the tire, and the number of layers and their width determines the width of the tire. In one embodiment, the tire has a width of 190 mm (7.5 inches). In other embodiments, the tire has a width of 12.5 mm to 1525 mm (0.5 inches to 60 inches). A tire having a plurality of layers in the axial direction may be referred to as a composite layer tire.

In one embodiment, adhesive or cement may be applied to a sheet of polymeric material before or after the reinforcement is placed on it. Additionally, additives or chemical treatment may be selectively applied to the polymeric sheets or to the reinforcements during the build process. Further, some sheets of polymeric material may have a contoured surface or a roughened surface to promote adhesion. For example, a sheet of polymeric material may go through a roughening process after it is placed on the tire.

While FIG. 1 shows alternating layers of polymeric sheets and reinforcements, it should be understood that several layers of polymeric sheets may be placed together or several layers of reinforcements may be placed together. It should also be understood that the reinforcements may vary on different layers. For example, a lower ring reinforcement may be placed on a first sheet, a pair of upper ring reinforcements may be placed on a second sheet, and spoke reinforcements may be placed on a third sheet.

After the tire 110 is built, it is then cured. In one embodiment, the tire is cured in a vulcanization mold. When the tire is cured in a vulcanization mold, the outer surfaces of the tire may be further shaped during vulcanization. In an alternative embodiment, the tire is cured in an autoclave. An autoclave may cure the tire at lower pressures than a typical vulcanization mold, thereby allowing the tire to maintain its shape. In yet another embodiment, the tire may be cured between metal plates of other materials. In still another embodiment, the curing step may be omitted.

Figure 2:
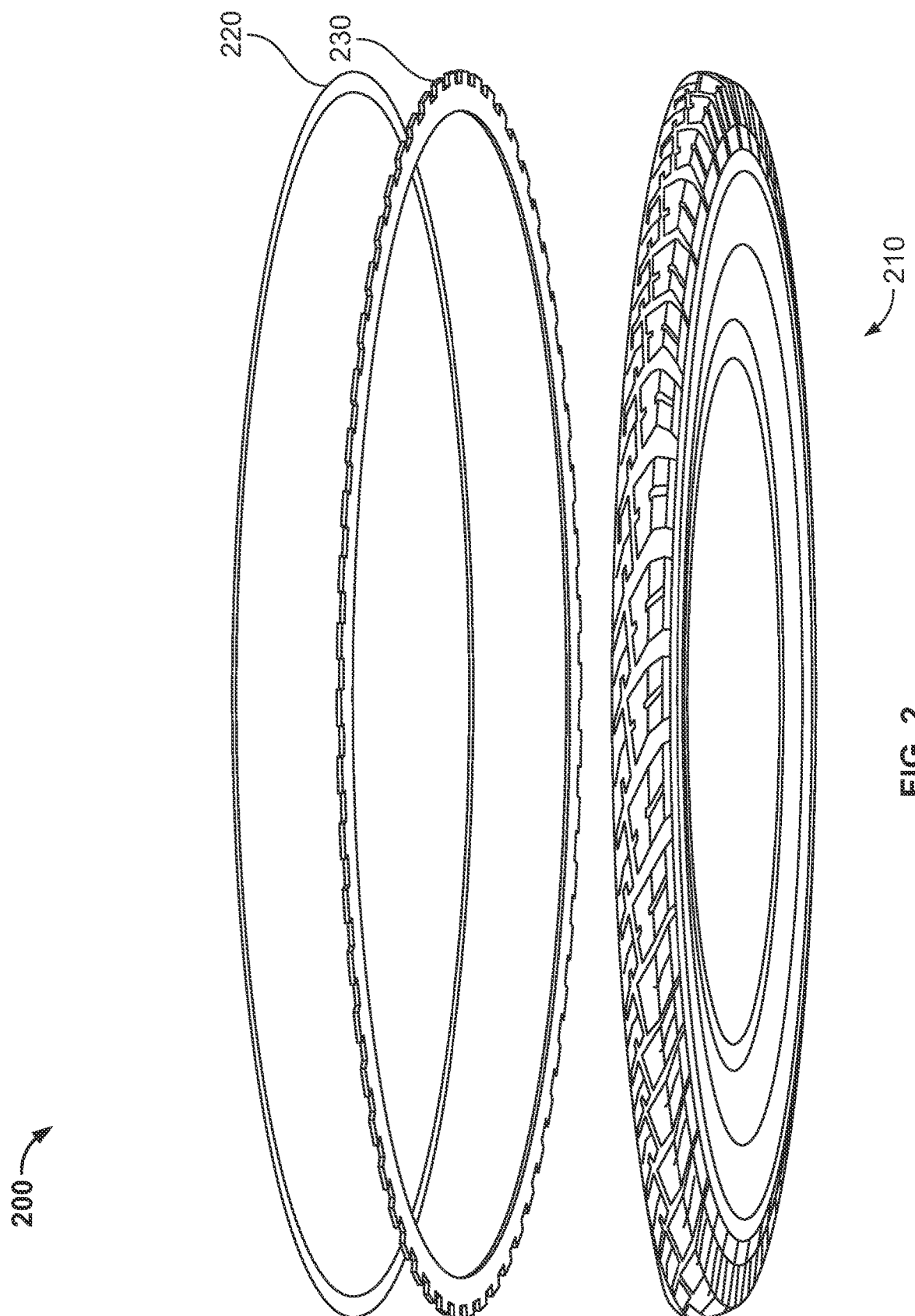
FIG. 2 illustrates an exploded view of one embodiment of a partially assembled pneumatic tire.

FIG. 2 illustrates an exploded view of one embodiment of a partially assembled pneumatic tire 200. The pneumatic tire 200 may be assembled using the same composite layer method described above. However, instead of spokes, the method is used to build bead portions (not shown), sidewalls 210, and a tread 220 of the tire. Additionally, the method may be used to build sidewall reinforcement layers (not shown) and crown region reinforcements 230. In the illustrated embodiment, the crown region reinforcements 230 are a pair of rings that define a shear element. The crown region may also include reinforcements that define circumferential belts or cap plies, instead of or in addition to the shear element.

After the green tire 200 is assembled it is cured in a vulcanization mold or an autoclave.

In both the pneumatic and non-pneumatic examples, electronics may be embedded into layers of the tire. For example, an RFID may be embedded in the tire. A conductive filament or material could be run through spokes or around other portions of the tire to allow for the detection of damage to the tire. For example, if a spoke is torn there would no longer be a conductive path and this could be sensed by the electronics in the tire. Conductive filaments may also be embedded in certain portions of the tire to aid in the discharge of static electricity that may build up as the tire rotates.

Many variations of composite layer tires are possible, for both pneumatic and non-pneumatic tires. For example, the type of material used as reinforcement may be selected to optimize the weight, stiffness, and other characteristics of the tire under various conditions. Likewise, the amount and location of the reinforcement may also be selected to optimize characteristics of the tire under various conditions.

Figure 3A:
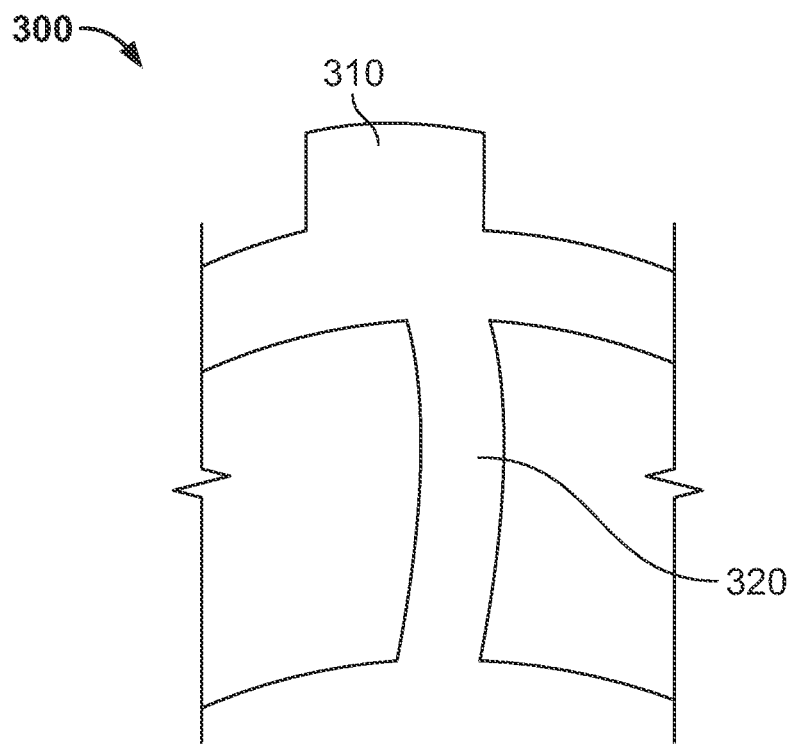
FIGS. 3A-3B illustrates a partial side view and a partial side cross-sectional view, respectively, of one embodiment of a tire.

FIG. 3A illustrates a partial side view of one embodiment of a tire 300. In this illustration, the tire 300 is a non-pneumatic tire having a tread 310 and spokes 320. In an alternative embodiment, the tire is a pneumatic tire.

In one embodiment, the tire 300 is a composite layer tire. In such an embodiment, each sheet of polymeric material may be formed with a desired tread shape. The sheets would be aligned during assembly to form the tread shape. Alternatively, the sheets may be formed with a circular diameter, or with only an approximation of the desired tread shape. In such an embodiment, the desired tread shape may be fully formed after the sheets are assembled to form the tire.

Figure 3B:
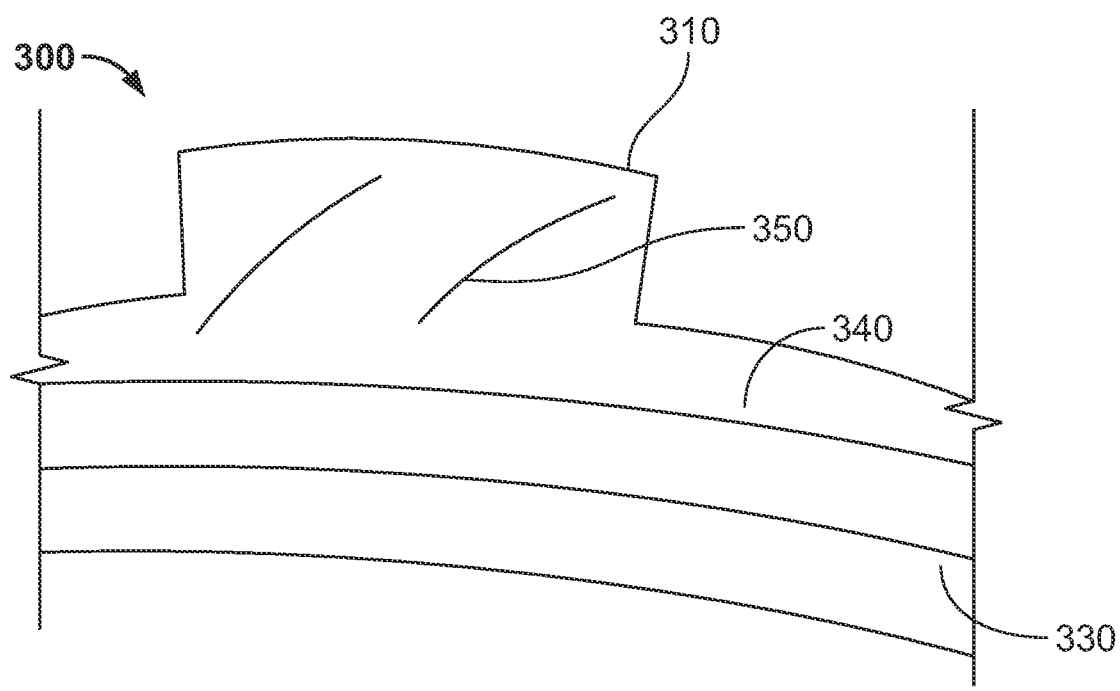

FIG. 3B illustrates a partial side cross-sectional view of the tire 300. In the illustrated cross-section, the crown region of the tire 300 includes a first pair of reinforcement rings, including a first lower ring 330 and a first upper ring 340. The first lower ring 330 is coaxial with the first upper ring 340. The first lower ring 330 has a first lower ring diameter, and the first upper ring 340 has a first upper ring diameter. Other upper and lower rings in the crown region may have the same upper and lower diameters, or the diameters may vary. In the illustrated embodiment, lower ring 330 and upper ring 340 define a shear element. In an alternative embodiment (not shown), the crown region may include only a single reinforcement ring. In another alternative embodiment (not shown), the crown region may include three or more reinforcement rings. In yet another embodiment (not shown), the reinforcement ring may be omitted.

The tread 310 of the tire 300 includes additional reinforcements 350. The additional reinforcement 350 may be embedded in the tire in the same manner as the reinforcements 150 are embedded in the tire 100 of FIG. 1. In other words, the additional reinforcement 350 may be placed between adjacent sheets of polymeric material during the building of a composite layer tire.

The reinforcements 350 may be constructed of a material selected from the group consisting of steel, polyester, nylon, carbon fiber, aramid, fiber glass, cotton, hemp, polyurethane and other plastic, other synthetic or natural fibers, and other metal materials. In the illustrated embodiment, the additional reinforcements are a plurality of cords disposed at an acute angle with respect to the radial direction of the tire 300. Alternatively, the cords may be parallel or perpendicular to the radial direction of the tire. In an alternative embodiment (not shown), only a single reinforcement cord is employed. In another alternative embodiment (not shown), the reinforcement is a mesh of material.

Figure 4:
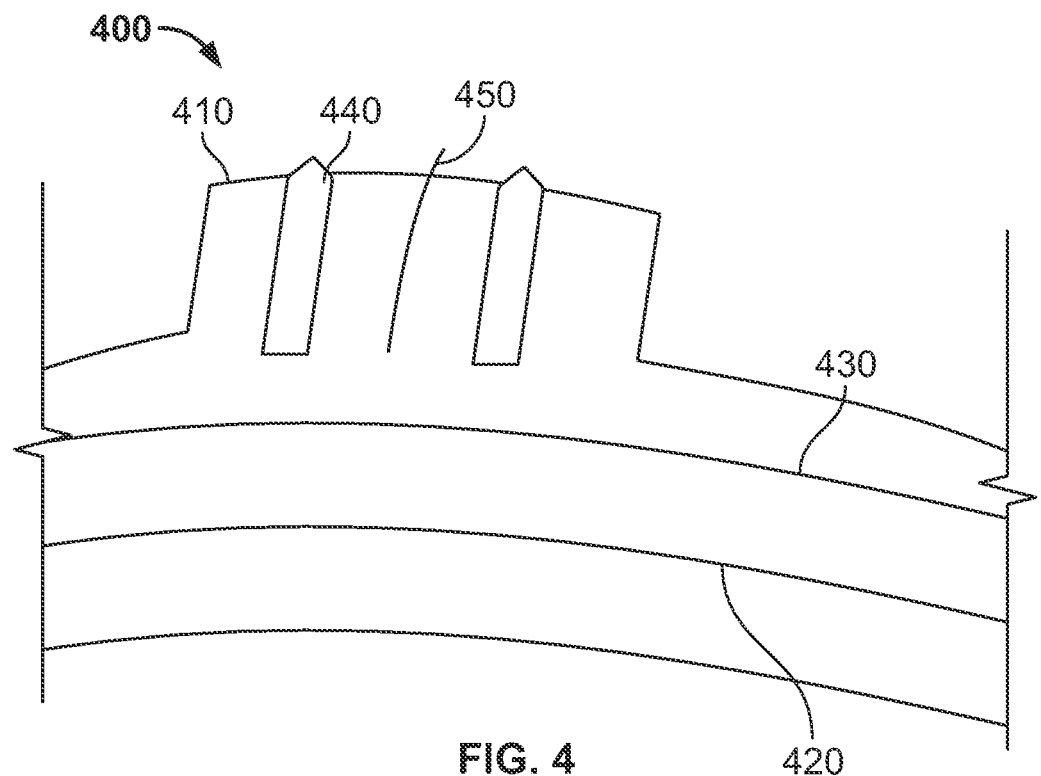
FIG. 4 illustrates a partial side cross-sectional view of an alternative embodiment of a tire.

FIG. 4 illustrates a partial side cross-sectional view of an alternative embodiment of a tire 400 having a tread 410. In this illustration, only a crown region of the tire is shown. The tire 400 may be a pneumatic or a non-pneumatic tire.

In the illustrated cross-section, the crown region of the tire 400 includes a first pair of reinforcement rings, including a first lower ring 420 and a first upper ring 430. The rings 420, 430 are substantially the same as the rings 330, 340 described above with reference to FIG. 3B. In alternative embodiments, the rings 420, 430 may be replaced by any one of the alternative arrangements discussed above with reference to FIG. 3B.

The tread 410 includes a plurality of objects that extend beyond the tread surface. In the illustrated embodiment, the tread 410 includes a plurality of pins 440 and wires 450 that extend beyond the tread surface. The pins 440 and wires 450 may be embedded in the tire in the same manner as the reinforcements 150 are embedded in the tire 100 of FIG. 1. In other words, the pins 440 and wires 450 may be placed between adjacent sheets of polymeric material during the building of a composite layer tire.

The pins 440 and wires 450 may provide additional traction in snow or off-road surfaces. The pins 440 and wires 450 may be constructed of a material selected from the group consisting of steel, polyester, nylon, carbon fiber, aramid, fiber glass, cotton, hemp, polyurethane and other plastic, other synthetic or natural fibers, and other metal materials. In alternative embodiments, the tread may include only pins or only wires. It should be understood that the tread may include any number of objects extending beyond the tread surface.

In the illustrated embodiment, the pins 440 have a substantially rectangular shape with a pointed end. In alternative embodiments, the pins may be triangular, rectangular, oval, or have any other geometric shape. The pins may be substantially flat, or they may have a geometric cross section.

In one embodiment, a plurality of pins, wires, or other projections are aligned axially across the tread. For example, while building a composite layer tire, projections may be place at the same circumferential location on top of each sheet of polymeric material. Alternatively, projections may be circumferentially offset on adjacent sheets of polymeric material in a predetermined pattern.

In the illustrated embodiment, the pins 440 and wires 450 are spaced from the upper ring 430. In an alternative embodiment, the pins and wires are connected to the upper ring.

Figure 5:
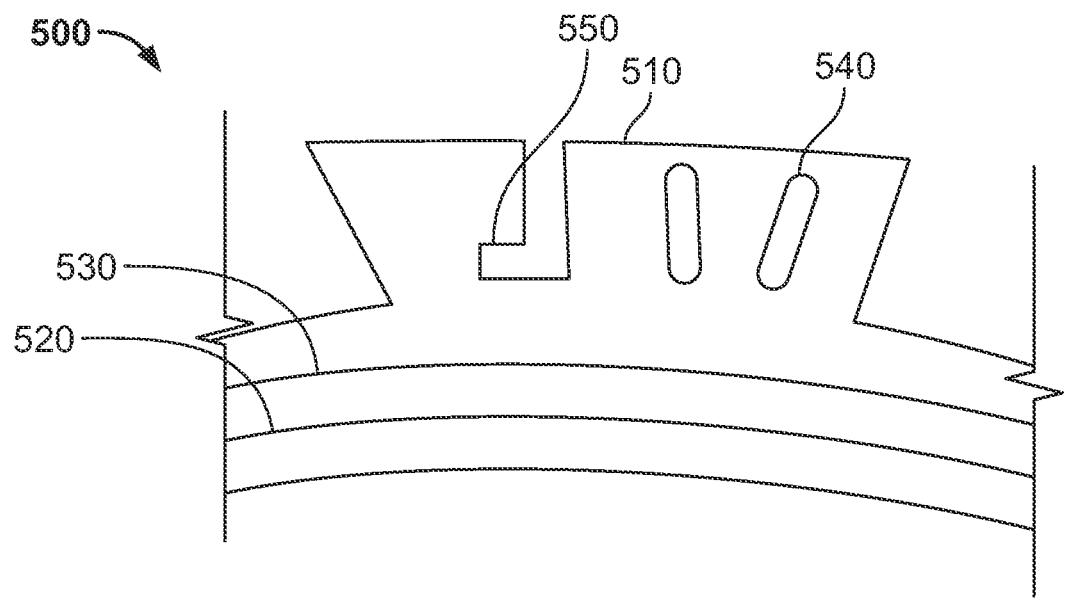
FIG. 5 illustrates a partial side cross-sectional view of another alternative embodiment of a tire.

FIG. 5 illustrates a partial side cross-sectional view of an alternative embodiment of a tire 500 having a tread 510. In this illustration, only a crown region of the tire is shown. The tire 500 may be a pneumatic or a non-pneumatic tire.

In the illustrated cross-section, the crown region of the tire 500 includes a first pair of reinforcement rings, including a first lower ring 520 and a first upper ring 530. The rings 520, 530 are substantially the same as the rings 330, 340 described above with reference to FIG. 3B. In alternative embodiments, the rings 520, 530 may be replaced by any one of the alternative arrangements discussed above with reference to FIG. 3B.

The tread further includes a plurality of voids. The voids include internal voids 540 having a closed geometric shape, and that are not visible from an external view of the tire. In the illustrated embodiment, the internal voids 540 have a substantially oval cross-section. In alternative embodiments (not shown), the cross-section of the internal voids may be triangular, square, rectangular, circular, or may have any geometric shape, including irregular shapes.

The voids also include visible voids 550 that open to an outside surface of the tread 510. The visible voids 550 may include undercut features. In other words, a first portion of the visible void 550 extends in a substantially radial direction and a second portion of the visible void 550 extends perpendicular to or at an acute angle with respect to the radial direction. It should be understood that the internal voids may also include undercut features.

While the illustrated embodiment shows a plurality of both internal voids 540 and visible voids 550, it should be understood that any number of voids may be employed. For example, the tire tread may include only internal voids. Alternatively, the tire tread may include only visible voids.

The voids of the tire 500 may be formed during a composite tire forming process. For example, voids may be cut into sheets of polymeric material that are assembled together. Alternatively, the sheets of polymeric material may be formed with voids during an additive manufacturing process, such as 3D printing. As another alternative, the sheets of polymeric material may be formed with voids during a molding process.

In one embodiment, the voids extend through an entire width of the tread. In an alternative embodiment, the voids only extend through a portion of the tread. The voids may extend in an axial direction, a circumferential direction, or at an acute angle with respect to the circumferential direction. The voids may have a consistent width, or the width may vary.

When a tire is cured at high temperatures and pressures, the green rubber may flow during the curing process. However, if the tire is cured at lower temperatures or lower pressures, the voids may maintain their shape during the curing process. For example, the tire may be cured in an autoclave at a lower pressure than would be provided during a curing process in a tire vulcanization mold. In one embodiment, the tire is cured at a temperature between 38° C. to 260° C. (100° F. to 500° F.) and at a pressure between 0.10 mPa to 0.70 mPa (15 PSI to 100 PSI). However, it should be understood that the tire may be cured at other temperatures and pressures.

It should be understood that although various elements of tires are shown separately in different drawings, a single tire may include any number of the elements described above. For example, a tire may have the voids 540, 550 shown in FIG. 5 and the protruding objects 440, 450 of FIG. 4. While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative apparatus and method, and illustrative examples shown and described. Accordingly, departures may be made from such details without departing from the spirit or scope of the applicant's general inventive concept.

In an alternative embodiment, a tread may be formed separately from a tire using a composite layer process. For example, in one embodiment, a user provides a first sheet of green rubber and forms a first predetermined tread shape along a portion of the first sheet of green rubber. The user then provides a second sheet of green rubber and forms a second predetermined tread shape along a portion of the second sheet of green rubber. The user then places the second sheet of green rubber on the first sheet of green rubber.

This process is then repeated with by providing additional sheets of green rubber, forming a predetermined tread shape along portions of a plurality of the additional sheets of green rubber, and placing the additional sheets of green rubber on the second sheet of green rubber, until a tread is built.

In one embodiment, each sheet of green rubber has a substantially circular shape. In such an embodiment, the final tread would be circular as well.

In an alternative embodiment, each sheet of green rubber has a substantially rectangular shape. In such an embodiment, the final tread would be a tread flat that can be wrapped around a tire carcass. The tread flat may be built in an axial direction or in a circumferential direction.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

What is claimed is:

1. A green tire comprising:
   a plurality of sheets of green rubber having a substantially circular shape, each sheet having a thickness in the axial direction between 0.02 mm and 2 mm and a tread region disposed along a circumference; and
   a plurality of objects sandwiched between adjacent sheets of green rubber in the tread region, wherein each object is constructed of a material selected from the group consisting of steel, polyester, nylon, carbon fiber, aramid, fiber glass, cotton, hemp, polyurethane and other plastic, other synthetic or natural fibers, and other metal materials.

2. The green tire of claim 1, wherein each sheet of green rubber includes an upper ring, a lower ring, and a plurality of spoke portions extending from the upper ring to the lower ring.

3. The green tire of claim 1, wherein at least one of the sheets of green rubber defines a sidewall of the green tire.

4. The green tire of claim 1, wherein the plurality of objects includes an object that protrudes beyond the tread region of the green tire.

5. The green tire of claim 1, wherein the plurality of objects includes at least one of pins and wires.

6. The green tire of claim 1, further comprising a plurality of voids disposed below a surface of the tread region.

7. The green tire of claim 6, wherein at least one of the voids has a closed geometric shape.

8. The green tire of claim 6, wherein at least one of the voids defines an undercut in the tread region.

9. The green tire of claim 1, wherein the tread region includes a predetermined tread shape including at least one of lugs, blocks, grooves, ribs, and sipes.

10. A green tire comprising:
    a plurality of sheets of green rubber having a substantially circular shape, each sheet having a tread region disposed along a circumference, each sheet of green rubber having a plurality of voids disposed below a surface of the tread region, such that the voids are not visible from any external view of the tire, the sheets of green rubber having a thickness in the axial direction between 0.02 mm and 2 mm; and
    a plurality of objects sandwiched between adjacent sheets of green rubber in the tread region.

11. The green tire of claim 10, wherein each object is constructed of a material selected from the group consisting of steel, polyester, nylon, carbon fiber, aramid, fiber glass, cotton, hemp, polyurethane and other plastic, other synthetic or natural fibers, and other metal materials.

12. The green tire of claim 10, wherein the plurality of objects includes at least one of pins and wires.

13. The green tire of claim 10, wherein the tread region includes a predetermined tread shape including at least one of lugs, blocks, grooves, ribs, and sipes.

14. A green tire comprising:
    a plurality of sheets of green rubber having a substantially circular shape, each sheet having a tread region disposed along a circumference, an upper ring, a lower ring, and a plurality of spoke portions extending from the upper ring to the lower ring, the sheets of green rubber having a thickness in the axial direction between 0.02 mm and 2 mm;

a plurality of objects sandwiched between adjacent sheets of green rubber in the tread region, at least one of the plurality of objects protruding beyond the tread region of the green tire;

wherein the at least one of the plurality of objects that protrudes beyond the tread region of the green tire includes at least one of pins and wires.

15. The green tire of claim 14, wherein at least one of the sheets of green rubber defines a sidewall of the green tire.

16. The green tire of claim 14, further comprising a plurality of voids disposed below a surface of the tread region.

* * * * *